Patented Aug. 6, 1935

2,010,573

UNITED STATES PATENT OFFICE 2,010,573

METHOD OF TREATING MILK

Byron H. Webb, Washington, D. C., dedicated to the free use of the public

No Drawing. Application May 14, 1932,
Serial No. 611,446

3 Claims. (Cl. 99—11)

(Granted under the act of March 3, 1883, as
amended April 30, 1928; 370 O. G. 757)

This application is made under the act of March 8, 1883, as amended by the act of April 30, 1928, and the invention herein described, if patented, may be manufactured and used by or for the Government, for governmental purposes, without payment to me of any royalty thereon.

I hereby dedicate the invention herein described, to the free use of the public, to take effect upon the granting of a patent to me.

My invention relates to a new method for the separation of some of the constituents of milk and of other similar colloidal dispersions and new processes in the manufacture of dairy products resulting from such separations.

A method by which a hydrated colloid dispersed in a mixed solvent could be easily removed without partial denaturation of the disperse phase would be of value. A process by which this can be cheaply accomplished, constitutes the most important part of my invention. Casein is present in milk as a hydrophilic colloid and its separation in the natural state has always been attended with many difficulties. The casein dispersion found in milk and milk products is the colloid with which this process is chiefly concerned, although the principle involved herein may be used for the separation of any colloidal dispersion similar to milk.

Aside from the separation of an undenatured casein from aqueous milk products this invention also relates to the separation of a clear milk serum. It is well known that when milk and cream are frozen and subsequently thawed, an incomplete and partial separation of some of the casein into larger aggregates takes place. As a result a milky serum may be drained from the thawing mass. It is only after holding the milk or cream in a frozen state for 8 to 12 months that a relatively clear serum may be separated from the melting mass. My present invention makes it possible to separate a very clear serum from milk or cream within 24 hours of the time it is frozen.

Previous methods to obtain pure casein from milk have involved the use of (1) precipitating reagents which partially denature and change the natural condition of the casein, or of (2) extremely high centrifugal force to throw the casein particles down as a sediment. The latter method, while producing normal casein, requires the use of expensive centrifuging equipment and the volume produced is necessarily small.

By means of the process herein described, relatively pure undenatured casein may be obtained in large quantities from milk at low cost.

When milk is frozen the normal emulsion of the fat is destroyed, and as a result in the thawed product the fat separates or oils off. The oiling off of the fat after thawing increases as the fat content of the product is raised. If some method could be found to cause the casein of the milk to be adsorbed upon the fat, then a casein-fat mixture would be obtained after thawing the frozen product.

I have discovered such a result can be produced when milk or cream is homogenized before freezing. When homogenized, frozen cream is thawed at temperatures below the melting point of the fat, the milk serum separates as a clear liquid from the casein-fat mixture and can be withdrawn free of fat and casein. The fat-casein mixture may be washed with water and then redispersed in water. The fat can now be removed by centrifugal separation and the casein solution refrozen, thawed and reseparated to remove any remaining fat.

The term homogenization is herein considered to mean the passage of a fat emulsion through a homogenizer, viscolizer or similar device whereby the fat is broken up into very minute globules, thus causing its emulsion to be relatively permanent.

A description of this part of my process is as follows: 50 pounds of cream containing approximately 30 per cent fat and 6.2 per cent milk-solids-not-fat is heated to 60° C., homogenized at approximately 2500 pounds pressure, cooled, and placed in cans in an ice box held at below 0° C. or preferably at −18° C. until frozen completely, which may take 24 hours or longer. The cream is then thawed at a temperature below the melting point of the fat, preferably about 10° C. During thawing the milk serum, consisting of the water, salts, albumin and lactose of the milk, melt and may be removed by filtration or by simple drainage. A clear serum can be obtained, leaving as a residue on the filter a mixture of fat and casein which may be washed with cold water if desired to further remove the serum. This mixture, together with the filtrate or milk serum have various uses. To separate the casein from the fat-casein mixture a quantity of water equal to the serum removed is added. The amount of water can be adjusted to give the desired concentration of casein solution, but at least one-third the weight of the serum should be replaced as water. The mixture is heated to 60° C. to melt the fat and dissolve the casein, cooled to 36° C. and the fat separated from the mixture by centrifugal separation. If a very fat-free casein solution is desired the solution after separation can be refrozen, thawed and reseparated at this stage to free most of the remaining fat. The casein solution thus obtained may be used as such, sterilized in tins or powdered. The powdering process reduces somewhat the solubility of the casein.

The temperature of homogenization may vary within wide limits. I have found that the lower temperatures, 40° C.–60° C. give a more efficient separation and a clearer serum, but the process may be carried out at any temperature above the melting point of the fat.

While the fat content of the original cream may vary from 10–50 per cent, the most efficient concentration is 30–35 per cent fat. The lower concentrations give greater yields of casein but the loss of casein and fat in the serum is proportionally greater. For maximum yields of casein regardless of the casein-fat content of the serum, a cream of 15 to 20 per cent fat is best employed. To obtain a clear serum, cream of 30–35 per cent fat should be used.

Any animal or vegetable fat which can be emulsified in skim milk may be substituted for butter-fat in this process with approximately the same results, although the taste of the product and the efficiency of separation will vary with the fat used.

Besides providing a new method for the production of a normal undenatured casein, this discovery opens up other processes which are new and useful in the production of improved dairy products.

The factor limiting the amount of milk-solids-not-fat which can be added to ice cream mix is the lactose concentration in the mix. Too high a concentration of lactose produces grainy, sandy ice cream. A simple, inexpensive method of removing the lactose from part of the ingredients of the mix would be of value to the ice cream manufacturer. An increase in the lactose-free milk-solids-not-fat of a mix to the extent of 3 per cent or more tends to produce a salty tasting ice cream.

A new process of increasing the protein of an ice cream mix without increasing the lactose or salt concentration is part of my present invention. The process is as follows: The above described casein-fat mixture is prepared by homogenizing and freezing the cream which is to be used in the ice cream mix. After the cream has been thoroughly frozen it is thawed out at 10° C. in a container which has a porous bottom through which the lactose-salt-albumin solution automatically passes as it melts leaving the fat-casein mixture, which is now added to the ice cream mix before pasteurization. The treatment of all the cream to be used in the mix in this manner will raise the milk-solids-not-fat of the mix approximately 1.5 per cent without increasing its lactose or salt content.

A use for the milk serum removed from the fat-casein mixture I have devised as follows: The serum, consisting of lactose, albumin and milk salts is high in food value and retains much of the characteristic flavor of milk. This product may be advantageously added to sherbets in place of ice cream mix, milk or cream which is now used by the ice cream manufacturer. The use of this serum in sherbets gives an improved product which contains a high percentage of milk solids. From 30–80 per cent of the weight of the sherbet-mix may well consist of this milk serum.

Besides the use of this normal, fresh milk serum in raising the milk solids in sherbets there are many other uses for such a product which contains large quantities of lactose and undenatured soluble milk albumin.

Having fully disclosed my discovery, I claim as my invention:

1. A new process for the separation of milk colloids which comprises causing the milk colloids to be adsorbed upon an immiscible fat phase, by forcing the colloid and fat at a temperature above the melting point of the fat, through an orifice or homogenizer at a pressure in excess of 500 pounds per square inch, completely freezing the homogenized mixture at temperatures below 0° C., thawing the frozen mass at a temperature below the melting point of the fat phase, draining or filtering off the liquid serum which separates during thawing, mixing the solid residue collected on the filter with water and heating the mixture to melt the fat and redisperse the colloid particles, and separating the immiscible fat phase by centrifugal separation and collecting the purified colloidal solution.

2. A new process for the separation of casein from fluid milk or a product which comprises homogenizing a mixture containing a vegetable, animal or milk fat and said fluid milk or milk product at a temperature above the melting point of the fat and a pressure in excess of 500 pounds per square inch, completely freezing the homogenized mixture at temperatures below 0° C., thawing the frozen mass at a temperature below the melting point of the fat phase, draining or filtering off the liquid serum which separates during thawing, mixing the fat-casein residue with water and heating the mixture to melt the fat and redisperse the casein, and removing the fat by centrifugal separation and collecting the purified casein solution.

3. A new process for the preparation of milk serum comprised of homogenizing a mixture consisting of a vegetable, animal or milk fat and a fluid milk or milk product at a temperature above the melting point of the fat and a pressure in excess of 500 pounds per square inch, completely freezing the homogenized milk product at temperatures below 0° C., thawing the frozen mass at a temperature below the melting point of the fat phase, and draining or filtering off the liquid serum which separates during thawing and collecting said serum in a suitable container.

BYRON H. WEBB.